C. L. PEMBERTON.
FISHING REEL.
APPLICATION FILED DEC. 13, 1918.
1,325,264.
Patented Dec. 16, 1919.
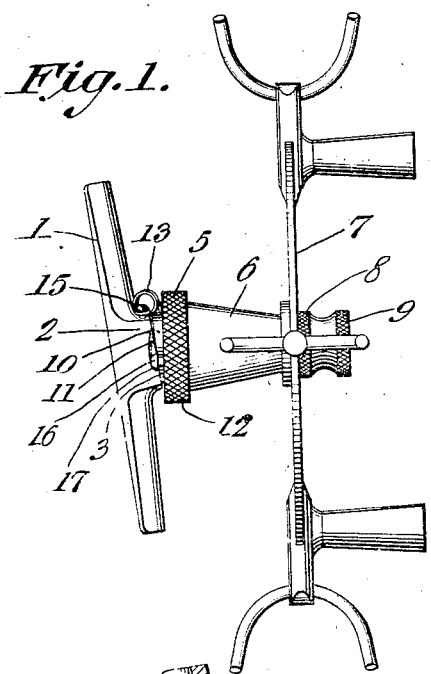
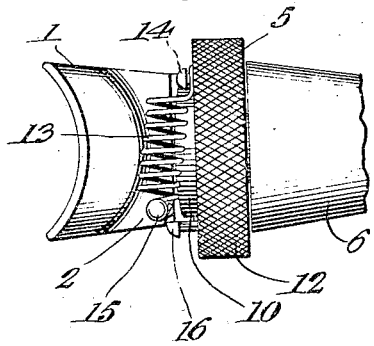
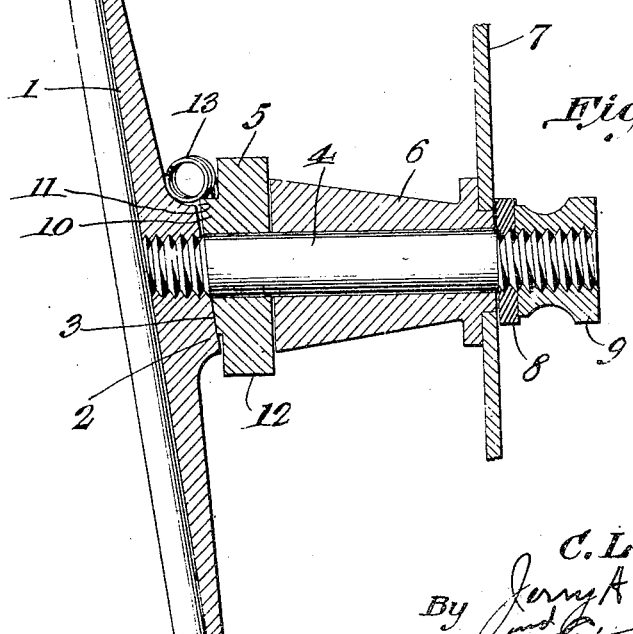
Inventor
C. L. Pemberton
By Jerry A. Mathews
and Lester L. Sargent
Attorney

UNITED STATES PATENT OFFICE.

CYRUS L. PEMBERTON, OF FAIRMOUNT, INDIANA.

FISHING-REEL.

1,325,264.  Specification of Letters Patent.  Patented Dec. 16, 1919.

Application filed December 13, 1918. Serial No. 266,609.

*To all whom it may concern:*

Be it known that I, CYRUS L. PEMBERTON, a citizen of the United States, residing at Fairmount, in the county of Grant and State of Indiana, have invented a new and useful Fishing-Reel, of which the following is a specification.

The object of my invention is to provide an improved fishing reel of comparatively simple construction having a novel manually controlled brake, so arranged that it may be conveniently operated, and thus save the friction on the thumb necessitated by the use of ordinary reels, and which becomes very unpleasant to the fisherman.

In the accompanying drawings, illustrating my invention—

Figure 1 is a side elevation of my fishing reel;

Fig. 2 is an enlarged top plan or end view of the portion of the reel carrying the spring 13; and Fig. 3 is an enlarged longitudinal section on a median line through the main portion of the reel, showing the shape and means of mounting the cam.

Like numerals designate like parts throughout the several views.

Referring to the accompanying drawings I provide a suitable base plate 1 having a suitable boss 2, to which is attached or mounted the reel axle 4 having threaded ends, and which on its outer end carries the nut 9 and washer 8 to retain reel 7 and reel hub 6 and cam 5 in place, and in operative engagement as illustrated. Cam 5 is provided with a knurled exterior surface 5 to enable the user to readily rotate same with his thumb. Member 5 has a cam face 11 of its cam portion 10 shaped to bear against the face 3 of boss 2 of the base 1 which in turn is secured to the handle of the fishing rod in the customary manner. A suitable spring 13 is attached at one end by a pin 14 to cam 5; and at its other end is attached by a pin 15 to the boss 2 as shown in Fig. 2. Cam 5 is further provided with a suitable stud or projection 16 adapted to abut against a suitable indented or projecting portion of boss 2, to limit the rotator's movement of the cam under the action of spring 13. Reel 7 may be of any suitable and desirable construction, such as illustrated, preferably, in Fig. 1.

In operating the brake on my fishing reel the thumb is pressed against the knurled surface 5 of the cam and it is rotated with a hands-of-the-clock movement against the action of spring 13, which tends to swing the cam back to its usual position whenever pressure on it is released. The rotation of the cam causes the cam face 11 to bear with increasing pressure against the surface 3 of boss 2, thus in turn causing the opposite face of the cam to bear against the adjacent face of reel hub 6 and brake the reel in its rotative movement to an extent varying with the pressure exerted on and rotation of the cam 5. As will be seen by reference to Fig. 2 the cam is caused to swing back to its original position by the action of spring 13 but is limited in its rotation by the engagement of stud 16 with portion 17 of the boss 2. The device may be readily taken apart or assembled, as will be seen by referring to Fig. 3, and it has no intricate or complicated parts which might get out of order. It is a contrivance by which pressure can be gradually applied to the reel to impede or stop its motion. The pressure may be increased or diminished at will, and in this respect is differentiated in an important way from reels which have contrivances that merely operate as a drag instead of as a brake subject to manual control. The result is obtained by the rotation of the cam causing a shortening of the space allowed for the rotating parts on the axle or shaft 4, and thereby creating friction between the reel hub 6 and cam 5.

What I claim is:

1. In a fishing reel, the combination with a base having a boss, said boss having one of its sides slightly concaved, a reel axle, a reel, a reel hub, of a cam member rotatably mounted on the reel axle, said cam member having a slanting cam face the high side of which is adapted to frictionally engage the face of the boss, said cam member being manually controlled to permit of regulating the degree of braking action exerted by its rotation, and resilient means exerting a limited resistance to rotative movement of the cam.

2. In a fishing reel, the combination of a base having a boss, a reel axle, a reel, a reel hub, fastening means securing the reel on the axle and hub, a member having a cam face adapted to frictionally engage the face of the boss, said cam member being knurled and manually controlled to regulate the degree of braking action, a stud carried by the cam and positioned to contact with the boss on the base, said boss having a slightly concaved portion in which the end of said stud is movably seated and with which it frictionally engages when moved beyond a limited range of movement, and a spring normally holding the cam in inoperative position, substantially as shown.

3. In a fishing reel, the combination of a base having a boss, a shaft screwed into the boss, a cam revolubly mounted on the shaft, said cam having a cam face the high side of which is adapted to frictionally engage the face of the boss and cause a foreshortening of the space for the various rotating parts to exert a braking action under manual control when the reel is unwinding, said cam having a knurled outer surface, means for limiting the range of movement of the cam by a graduated frictional resistance opposed to its continued movement, a suitable spring normally holding the cam in inoperative position, a reel element mounted on the shaft and with which the cam is adapted to operatively engage, a suitable fastening member threaded to the end of the shaft for securing the parts on the shaft, and a stud carried by the cam and adapted to engage the boss for the purposes described, whereby convenient and complete manual control of the braking action is obtained by rotative movement of the cam member.

CYRUS L. PEMBERTON.